United States Patent [19]
Yager et al.

[11] Patent Number: 5,983,236
[45] Date of Patent: *Nov. 9, 1999

[54] METHOD AND SYSTEM FOR PROVIDING A MULTIMEDIA PRESENTATION

[75] Inventors: Thomas Yager, Fort Worth, Tex.; Gregorio O. Loveria, III, Binghamton; Steven Getman, Williamsville, both of N.Y.

[73] Assignee: NAMS International, Inc.

[ * ] Notice: This patent issued on a continued prosecution application filed under 37 CFR 1.53(d), and is subject to the twenty year patent term provisions of 35 U.S.C. 154(a)(2).

[21] Appl. No.: 08/901,434

[22] Filed: Jul. 28, 1997

Related U.S. Application Data

[63] Continuation of application No. 08/277,865, Jul. 20, 1994, abandoned.

[51] Int. Cl.$^6$ .................................................. G06F 17/30
[52] U.S. Cl. ............................................ 707/104; 707/102
[58] Field of Search ........................... 707/103–200, 707/102; 345/326, 334, 348, 328; 704/260

[56] References Cited

U.S. PATENT DOCUMENTS

| | | | |
|---|---|---|---|
| 4,884,972 | 12/1989 | Gasper | 434/185 |
| 5,260,697 | 11/1993 | Barrett et al. | 345/173 |
| 5,278,943 | 1/1994 | Gasper et al. | 395/2 |
| 5,388,197 | 2/1995 | Rayner | 395/154 |
| 5,410,343 | 4/1995 | Coddington et al. | 348/7 |
| 5,500,919 | 3/1996 | Luther | 395/2.69 |
| 5,524,193 | 6/1996 | Covington et al. | 395/154 |
| 5,692,213 | 11/1997 | Goldberg et al. | 395/806 |

*Primary Examiner*—Wayne Amsbury
*Assistant Examiner*—Cheryl Lewis
*Attorney, Agent, or Firm*—Ronald Coslick

[57] ABSTRACT

The invention comprises a method and apparatus for the distribution, processing, and display of combinations of audio, video, still images, and text which are represented by binary data files. The invention may be adapted for use with any of the various audio, video, still image and text data formats which are utilized to represent such information. A specific embodiment of the invention adapted for use on a personal computer is disclosed.

6 Claims, 7 Drawing Sheets

Microfiche Appendix Included
(1 Microfiche, 60 Pages)

Video Clip Data File Components

METHOD AND SYSTEM FOR PROVIDING A MULTIMEDIA PRESENTATION

This application is a continuation of application Ser. No. 08/277,865 filed Jul. 20, 1994, abandoned.

This application includes a microfiche appendix consisting of sixty (60) frames printed on one microfiche.

COPYRIGHT NOTICE

A portion of the disclosure of this patent document contains material which is subject to copyright protection. The owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Synchronized combinations of audio, video, still images, and text are generically referred to as video clips. Through digitization, the electromagnetic signals which are used to represent each of these video clip components may be reduced to binary data files. These files may be stored in combination as video clip data files and may be transferred to and displayed by display units which are capable of processing the video clip data.

One way of distributing video clip data involves placing video clip data files on file servers which are accessible to users of digital computer systems through channels such as the Internet and analogous subscription network services. Ideally, such users could locate video clip data files, discern the data formats of the video clip data components, and process the video clip data on their digital computer systems to achieve display of the video clip. However, to date there exists no organized system for facilitating the identification of the data formats of the component data files which comprise a video clip data file, nor is there presently a digital computer system based video clip display unit which is capable of providing a coherent and synchronized display of the combination of audio, video, still images, and text represented by the data contained in such a video clip data file.

SUMMARY OF THE INVENTION

The present invention is intended to overcome the obstacles inherent in the state of the art and to provide users of digital computer systems with the ability to access server-based video clips which include audio, video, text, and still images and to use their digital computer systems as video clip display units. The invention may be practiced as a method for distributing a video clip, represented by data contained in a video clip data file, from a file server to a digital computer system user for display on the digital computer system, or as a method or apparatus for the display on a video clip display unit of video clips represented by data stored in a video clip data files. The invention is particularly intended to integrate the display of audio, video, and still images with the display of textual information relating to the audio, video, and still images being displayed.

DETAILED DESCRIPTION OF THE INVENTION

Figure 1:
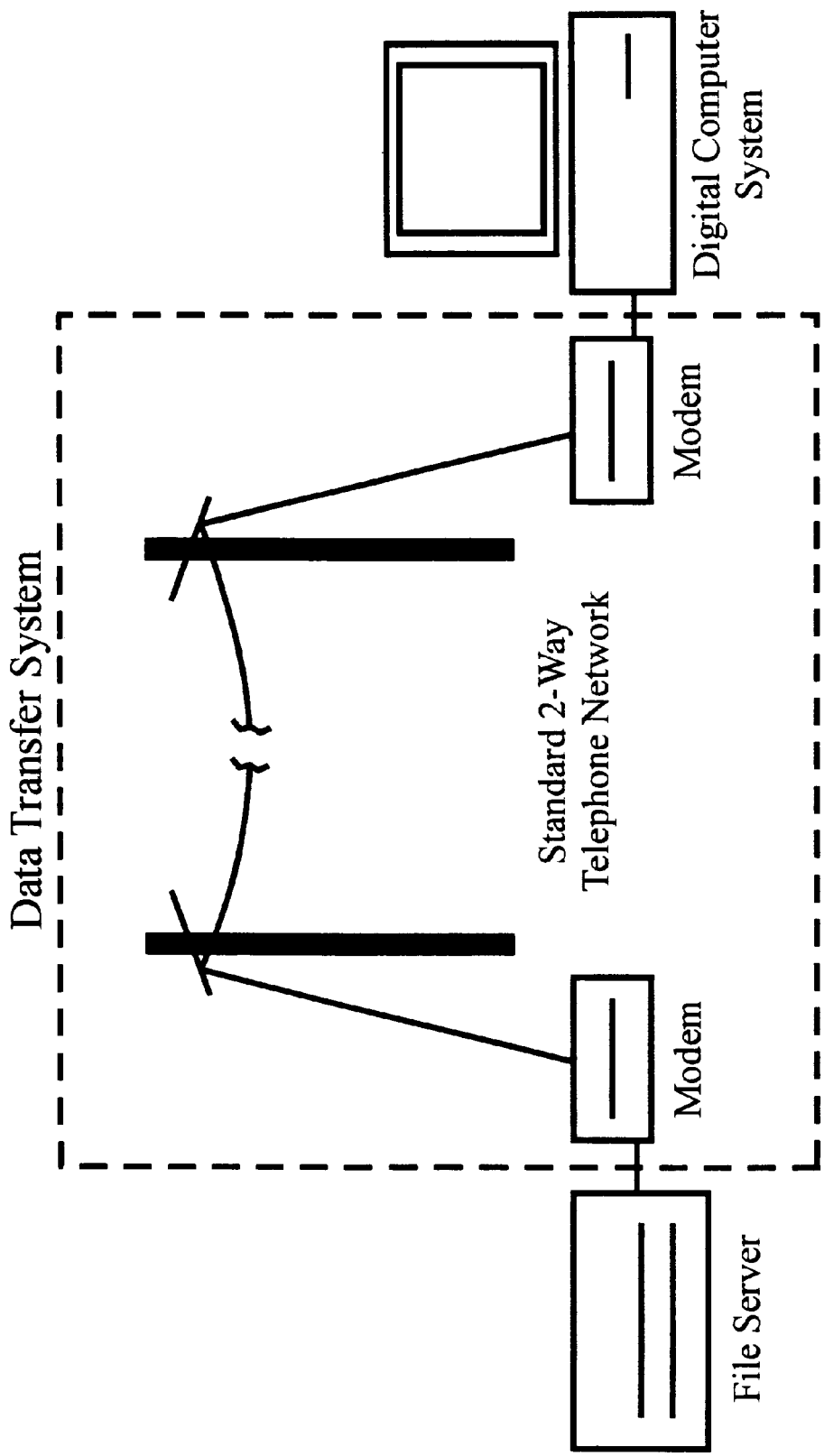
FIG. 1 illustrates a system for the distribution of video clip data files from a file server to a digital computer system.

FIG. 1 shows a generic representation of a server-based video clip data distribution system which utilizes commonly known digital data transfer technology. In this system, a file server having the capacity to store large amounts of binary data holds groups of binary data representing the combined component signals of individual video clips. A data transfer system links the file server to a remote digital computer system. The data transfer system consists of one or more modems, which are attached to the file server and which serve as a link between the file server and a telephone system. The modem is a device which is capable of transmitting and receiving an audio-band signal which is representative of binary data. Through the telephone system, one modem can communicate such a representative audio signal to another modem, thereby effectively communicating the contents of the video clip data file which the audio signal represents. A second modem at the end of the data transfer system may then communicate the video clip data file to the binary data file repository of a digital computer system, comprised of a data storage unit, a data processing unit, and audio and video display units, where the data will be available for subsequent processing and display. Future advances in telecommunications technology are expected to facilitate direct communication of digital data, eliminating the need for intermediate modulation and demodulation steps.

Figure 2:
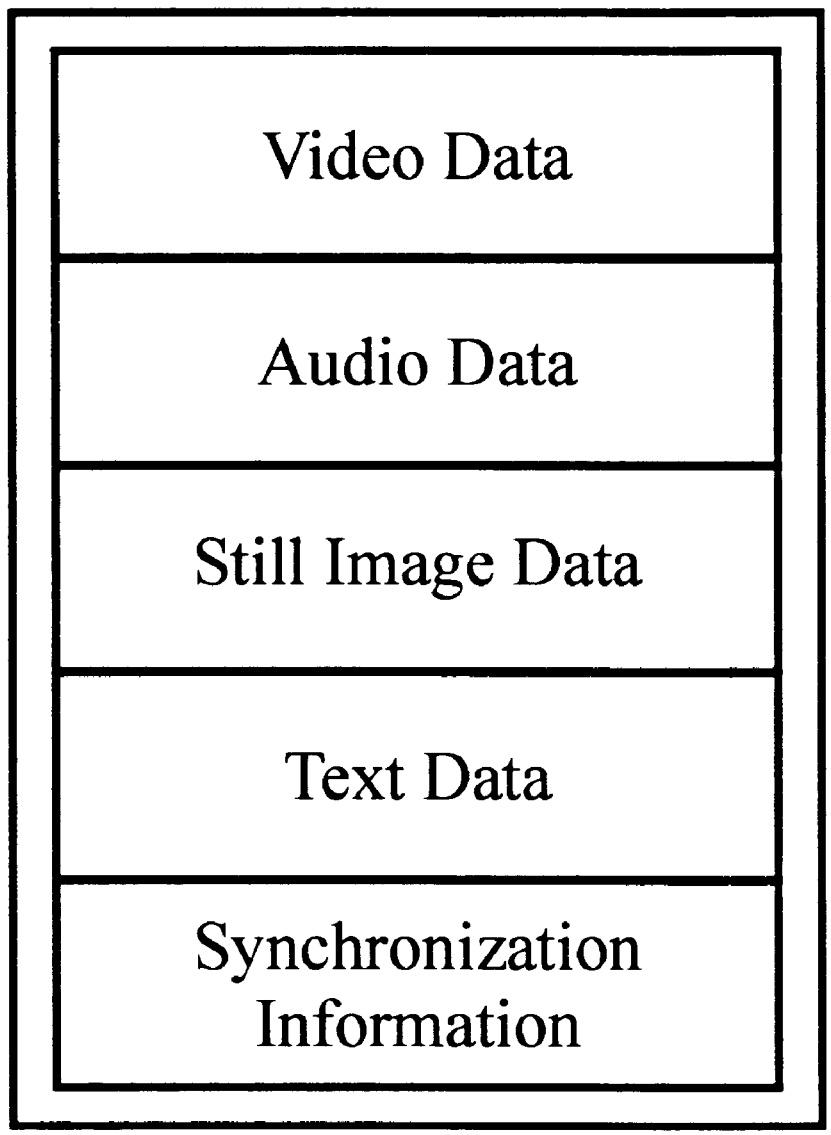
FIG. 2 illustrates the components which comprise a video clip data file.

A video clip data file contains data representative of all of the components of the video clip which it represents. FIG. 2 shows the component data which would be contained in a video clip data file representative of a video clip consisting of video images, still images, audio signals, and text. In addition to data representative of the contents of the video clip, the video clip data file must contain some information which indicates to the video clip display unit now the video clip components are to be synchronized. If the component data are maintained as separate groups of data, the synchronization information may consist of a separate group of synchronization data, such as a table which contains data indicating points of temporal correlation between the various video clip components. The display of a video clip represented by such data could be implemented through a method such as non-preemptive multitasking, wherein segments of each type data are sequentially processed and displayed. Alternatively, some or all of the component data of the video clip data file could be organized in an interleaved data format, which would consist of one or more data files in which segments of the separate component data are arranged and identified serially, in approximately the same order as that in which they would be accessed for display if stored separately.

A user wishing to obtain video clip data files from a file server must be provided with all of the component data as shown in FIG. 2. This may be achieved by transferring each component data file individually. The optimal way of making this data available is to archive any separately maintained component data files into a single video clip data file identified by a singel video clip data file identifier. This may be achieved by using any known archiving algorithm.

Additionally, it is optimal to inform the potential user as to the type and quality of the audio, video, and still image signals which are represented by the component data contained in the video clip data file. This may be accomplished by assigning a unique identifier to which is representative of the type and quality of component signals to each component data file. An audio component file type identifier may be used, for example, in conjunction with the eight character file identifier standard of operating systems such as DOS and WINDOWS. When used in conjunction with a file identifier in a systematic and conspicuous manner, such as by systematically incorporating the format identifier as the last two characters of the file identifier, the type and quality of the audio component of the video clip audio may be discerned through reference to a table of file format identifiers. Similar identifiers may be adopted for representation of the component file data types of video, still image, text, and interleaved component data files. File type identification may be accomplished manually or may be automated through the use of a look-up table embodied within the video clip display unit.

Figure 3:
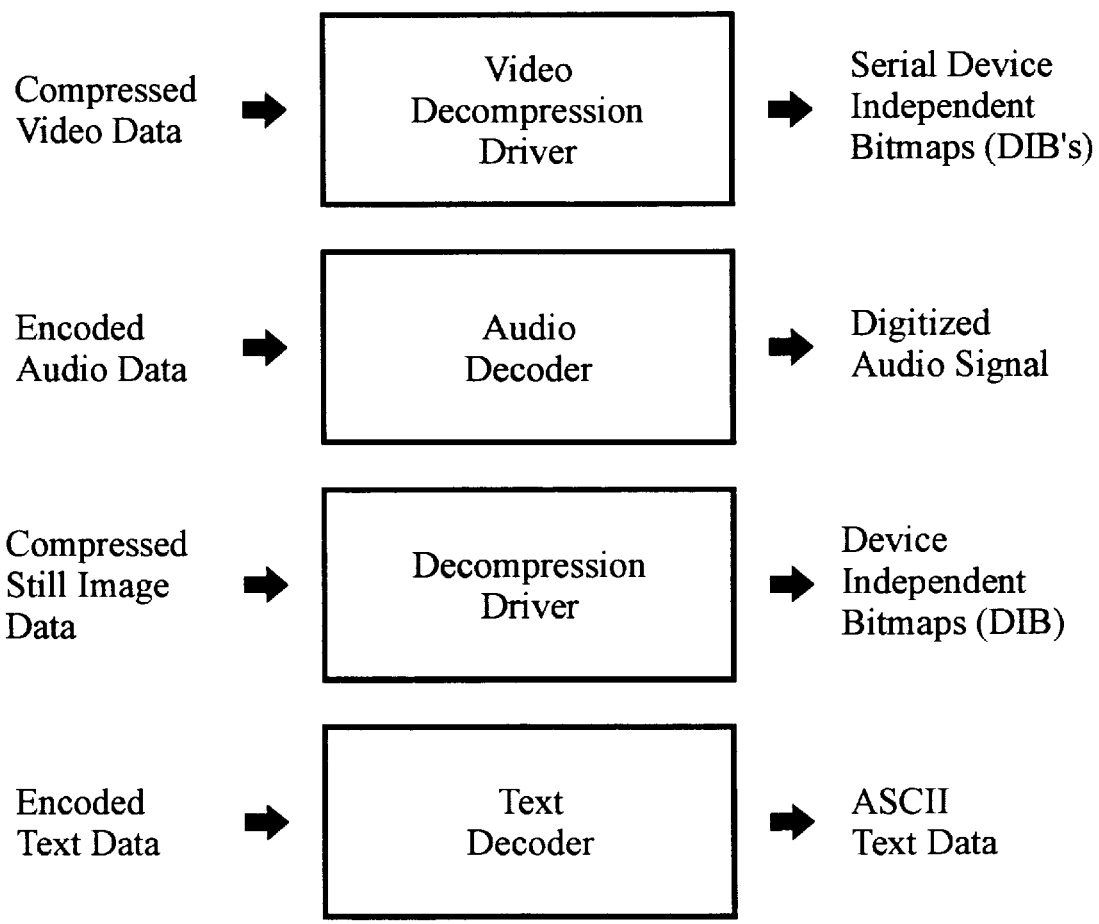
FIG. 3 illustrates the flow of component data through the respective decoding modules of a video clip display unit.

When audio, video, still images, and text are digitized for storage and distribution, they are typically converted first from analog signals to raw data, and are subsequently compressed or encoded using algorithms which either reduce the amount of information required to represent the respective signal or remove information unnecessary for the regeneration of the respective signal at the desired level of quality. Video clip component data files typically contain data which has been subjected to one or more of such algorithms, and as a result, the video clip display unit must be capable of reversing the compression or encoding process to yield raw video clip component data. This process is carried out by units referred to as decoders or decompression drivers. FIG. 3 illustrates the four analogous processes which the respective video clip component data undergo to yield display-ready video clip data. FIG. 3 illustrates these processes as they would be applied to video clip component data in which the component data are maintained independently of one another. In an alternative embodiment, in which an interleaved storage format as described above is utilized, for example, a format in which audio and video data are interleaved, the interleaved data would be processed by a single decompression driver capable of decompressing such data.

Figure 4:
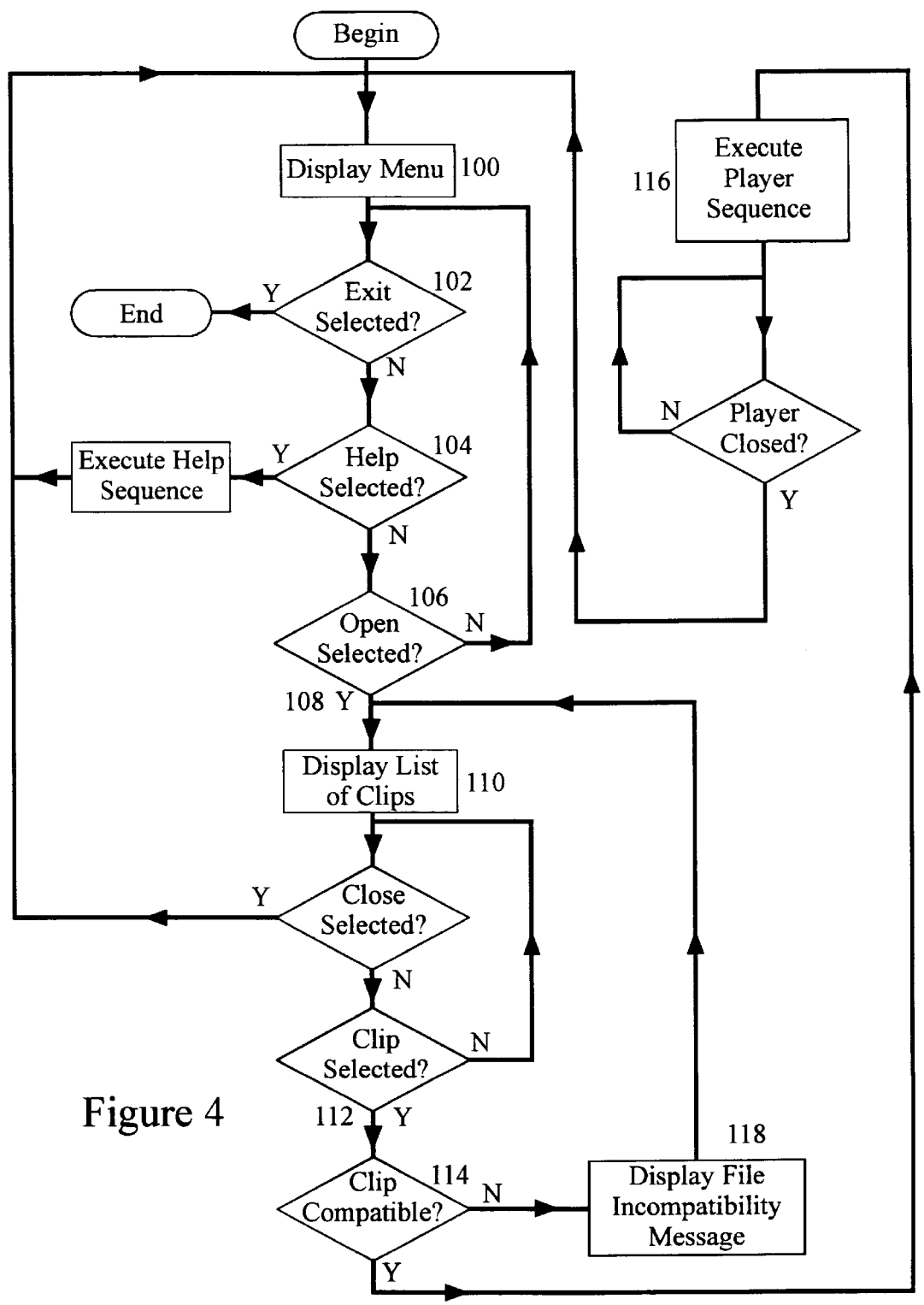
FIG. 4 illustrates a logical sequence of steps executed by a video clip display unit embodying the present invention.

FIG. 4 presents a flow diagram which outlines the basic logical sequence of steps which are executed in a real-time video clip player embodying the invention. The sequence begins by presenting 100 to a user of a video clip display unit the options of quitting 102 the video display unit, seeking help 104 from the unit as to how to operate the unit, or beginning 106 the sequence of steps necessary to display a video clip. If the user chooses to begin the display sequence, the video clip display unit accesses its memory and presents 110 the user with a list of data files which the user may attempt to display. Upon the selection of a data file, the file is examined 114 by the video clip player to determine if the component data files utilize data formats which are compatible with the display unit. If the files are compatible, the video clip player initiates 116 the execution of a sequence of steps which will result in the display of the video clip. If the files are not compatible, an indication of incompatibility is displayed 118 and the user is prompted to make another selection.

Figure 5:
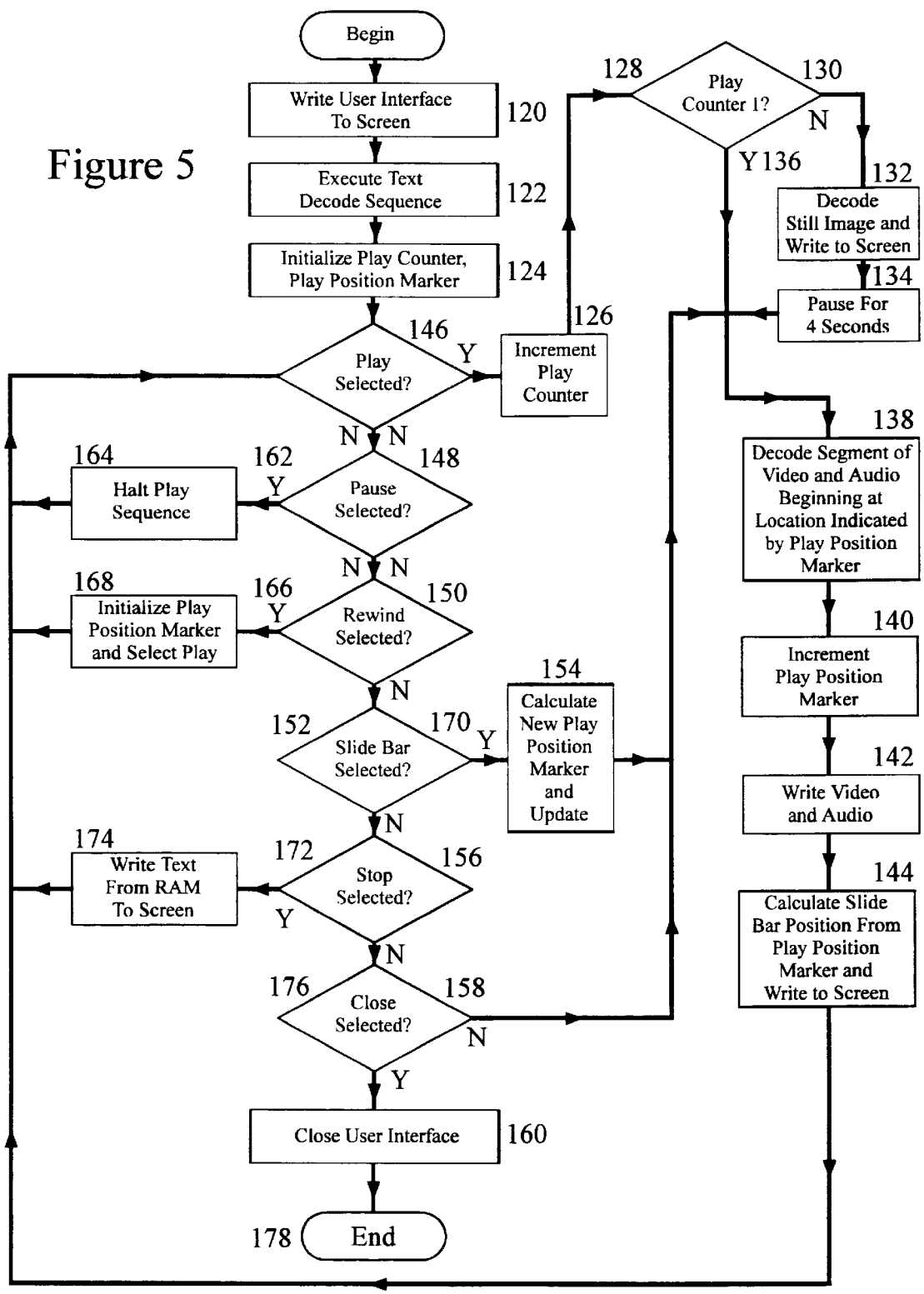
FIG. 5 illustrates a logical sequence of steps executed by the video clip display sequence of a specific embodiment of the present invention.

FIG. 5 presents a flow diagram which outlines the basic logical sequence of steps which are executed in the display sequence of a video clip player embodying the invention. The sequence begins by writing 120 a video clip display user interface to the display screen of the video clip display unit. The user interface, a specific embodiment of which is illustrated in FIG. 10, comprises a video display area 50 in which text, still images, and video images may be displayed. The user interface further comprises first 52 and second 54 text display areas in which text may be displayed. The user interface is further comprised of a user control array 70, which provides the user with controls which allow him to play 60, rewind 62, pause 64, and stop 66 the video clip, and close 68 the video clip player user interface. The user interface is also comprised of a slide bar 58 located within a slide bar area 56 which allows the user to select a position within the video clip from which display is to be commenced.

Once the user interface has been written to the screen of the video clip display unit, a text display sequence for displaying text within the user interface is initiated 122. The text display sequence is discussed at greater length below. Subsequently, a play counter and play position marker are initialized 124. The play counter maintains a record of the number of times that the user has initiated the playing of the video clip subsequent to selecting it for play. Upon each playing, the play counter is incremented 126. Also upon each playing, the value held by the play counter is examined 128. If the value of the play counter indicates 130 that the play request being responded to is the first of such requests, the video display unit will display 132 any still image, represented by a still image data component in the video clip data file, for four seconds 134 prior to initiating real-time decoding 138 and display 142 of audio and video. If the play counter indicates 136 that the play request being responded to is not the first such request, the step of displaying the still image is skipped and video and audio display is initiated. Subsequent to the decoding 138 of a segment of audio and video, the play position marker is updated 140 to reflect the relative position within the entire video clip of the segment of audio and video to be displayed. A position for the slide bar within the slide bar area which is representative of the relative position of the audio and video segment being displayed within the video clip is then calculated 144 using the play position marker, and an updated slide bar is written to the user interface.

Subsequent to the initialization 124 of the play counter and play position marker, the display unit repeatedly scans the user control array for requests by the user for the display unit to perform certain predetermined functions. Specifically, the control array is monitored for requests 146 to play the video clip, for requests 148 to pause the display of the video clip, for requests 150 to return to the beginning of the video clip and to recommence play from the beginning of the video clip, requests 152 to manipulate the position of the play position marker and to thereby select the commencement of display of the video clip at a particular location within the video clip, and requests 156 to Stop the display of the video clip. In addition, the display unit repeatedly scans for requests 158 to close the user interface.

Figure 7:
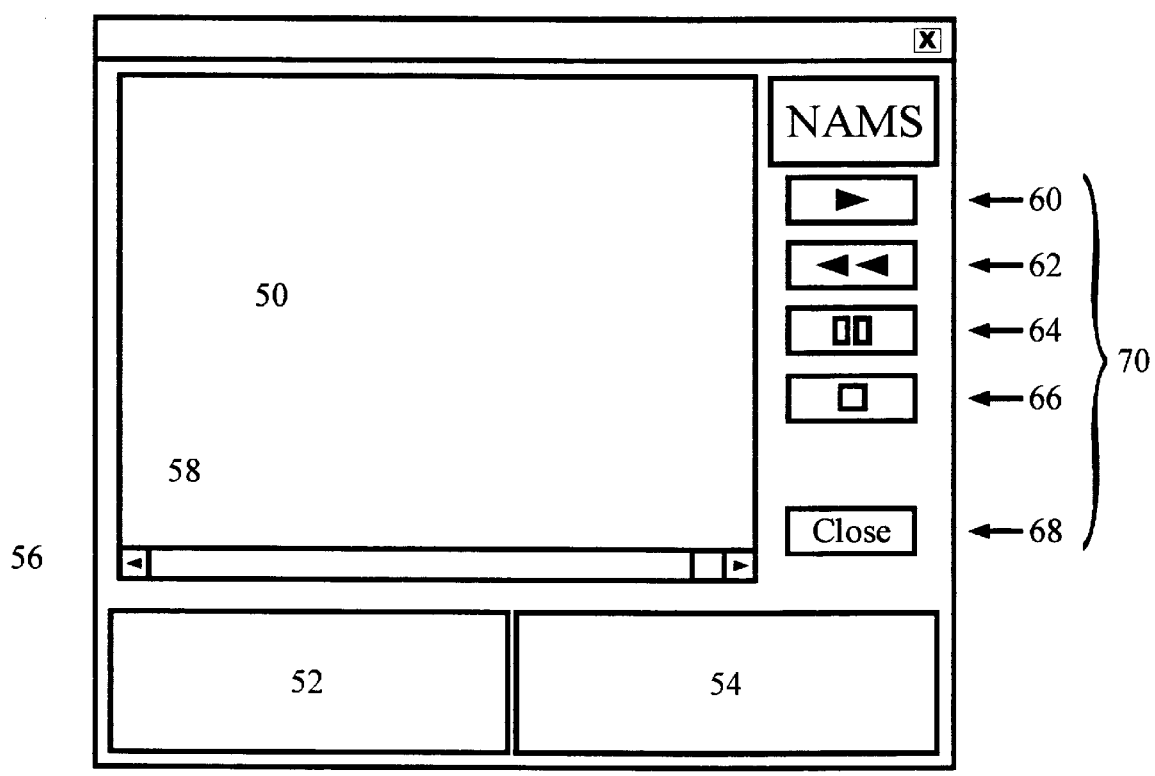
FIG. 7 illustrates a video clip user interface displayed by a specific embodiment of the invention.

Upon the detection 162 of a user request to pause the video clip, the flow of data is halted 164 and scanning of the user interface is resumed. Upon the detection 166 of a user request to rewind the video clip, the play position marker is reinitialized 168 and the play sequence is reinitiated. Upon the detection 170 of a user request to manipulate the position of the video clip segment by means of the slide bar, a new play position marker is calculated 154 based on the user-selected position of the slide bar and play is continued from that updated point. Upon the detection 172 of a user request to stop the display of the video clip, play is halted and text represented by text data maintained in RAM (described more fully below) is written 174 to the video display area. Upon the detection 176 of a user request to close the user interface, control of the display unit is returned 178 to the basic sequence as illustrated in FIG. 7 and as described above.

Figure 6:
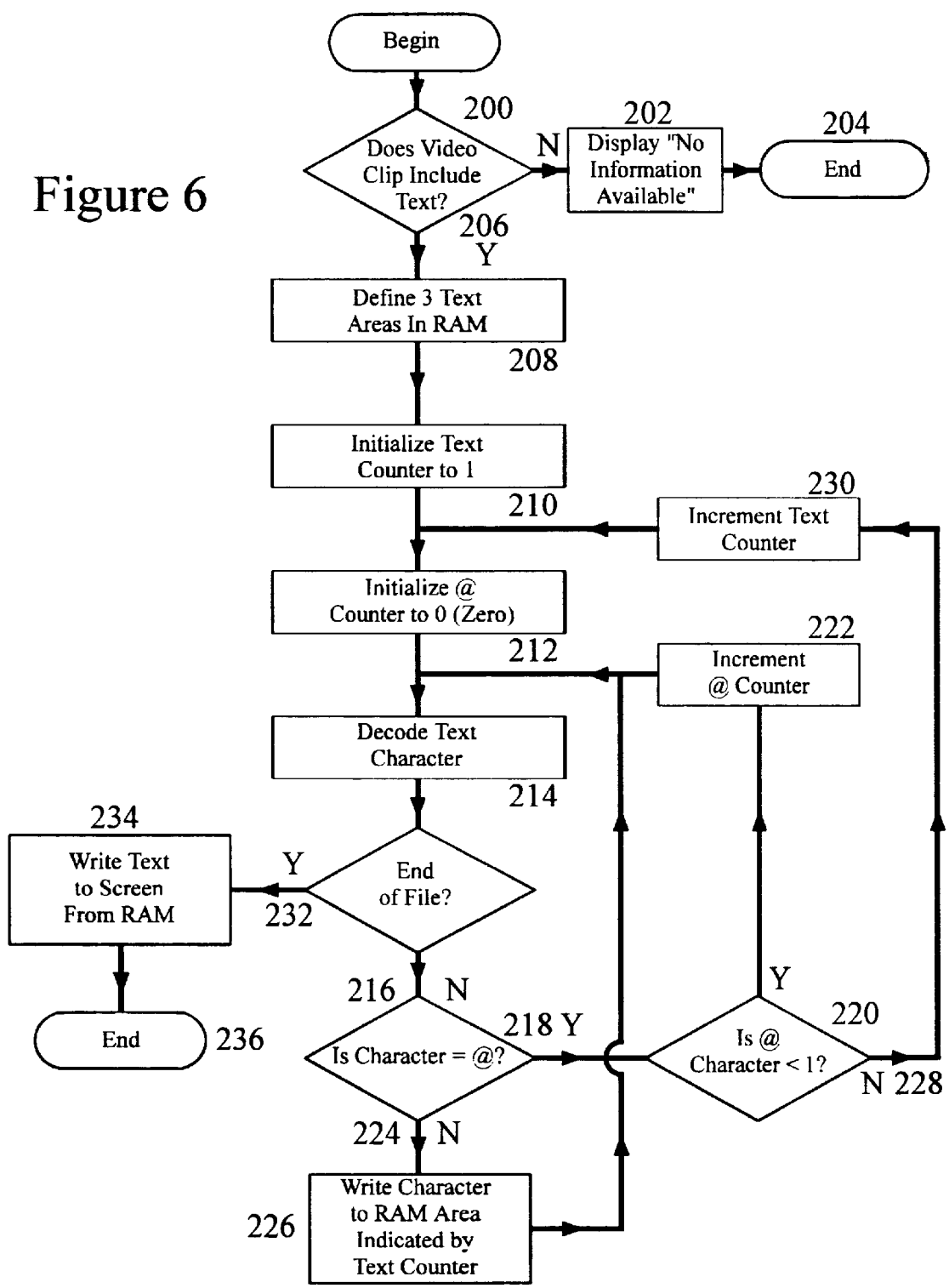
FIG. 6 illustrates a logical sequence of steps executed by the text display component of a specific embodiment of the present invention.

FIG. 6 presents a flow diagram which outlines the basic logical sequence of steps executed in the text decode and display sequence of a video clip player embodying the invention. The text decode sequence is initiated at the beginning of the video clip display sequence and begins with a determination 200 of whether the video clip data file includes data representative of text to be displayed in synchronization with the video and audio components of the video clip. If it is determined 202 that no text is included in the video clip, control is returned 204 to the video clip display sequence as illustrated in FIG. 8.

If it is determined 206 that the video clip data file includes data representative of text to be displayed in synchronization with the audio and video components of the video clip, three text areas in the random access memory (RAM) of the video display unit are defined 208. A text counter is then initialized 210. The text counter serves as a reference which indicates which of the three areas defined in RAM are to receive the text which is in the process of being decoded. A mark counter is then initialized 212. The mark counter provides a means for detecting marks which serve to demarcate distinct text data groups which are to be displayed in separate display areas on the user interface.

After the counters are initialized, a character of text is decoded 214. If the character does not indicate 216 that it is the last character within the text file, it is examined 218, 220, 222 to determine whether it is one of a combination of characters which demarcates the division between text to be written to different text areas defined in RAM. If the character does not indicate 224 that further text should be written to the next text area in RAM, the decoded character is written 226 to the area indicated by the text counter and the following encoded text character is decoded 214. If the character does indicate 228 that further decoded text should be written to the next text area defined in RAM, the text counter is incremented 230 and the next encoded text character is decoded 214. When the end of the text data file is reached 232, the text represented by text data in each of the three text areas defined in RAM is written 234 to the three separate display areas on the user interface and control is returned 236 to the display sequence as illustrated in FIG. 5 and described above.

As the sequence of FIG. 5 illustrates, the decoded text is the first component of the video clip to be displayed. Text stored as text data in the first RAM text area is displayed in the video display area 50, text stored as text data in the second RAM text area is displayed in the first text display area 52, and text stored as text data in the third RAM text area is displayed in the second text area 54. When the video clip is played, text displayed in the video display area 50 is overwritten by still or video images. However, because the decoded text is maintained in RAM for as long as the clip remains active within the video clip display unit, the text initially displayed in the video display area 50 may be redisplayed upon completion of play of the video clip, while text displayed in the text display areas 52 and 54 of the user interface remains displayed throughout the entirety of the display of the video clip.

Specific Embodiment and Best Mode of the Invention

The information disclosed hereinafter, in combination with the detailed description of the invention provide above, describes a specific embodiment of the invention. This embodiment of the invention is the best mode of the invention known to the inventors as of the date of the filing of this application.

This embodiment of the invention implements the disclosed process as computer software and utilizes a personal computer as the video clip display apparatus. It is optimized for use by a user of a personal computer which is capable of running WINDOWS applications and which includes a modem capable of accessing computer network services such as the Internet or analogous subscription services such as DELPHI. Computer code facilitating the practice of this embodiment of the invention on such a system is included as a microfiche appendix to this application. The code consists of five modules which are written in the C++ computing language and are designed for use as WINDOWS applications. The particular function of each module is described in headers provided at the top of each of the microfiched pages.

The video display process is preceded by acquisition of video clip data files by the user. This is accomplished by establishing a connection between the computer and a computer network service such as the Internet, the process of which is well known. The user then uses well known searching techniques to locate files which are compatible with the video clip player which is implemented on the user's personal computer. This process is facilitated by assigning a unique three character file identifier extension to a single video clip data file which consists of the component data files joined in a single data file through the use of any well known archiving format such as LHARC.

The video clip data file distribution process is further facilitated by assigning component data file identifiers which convey information as to the data format in which the video clip components are represented. In the present embodiment, this is accomplished by reserving the last two characters within the standard eight character file identifier for a two character code which reflects the type and quality of the audio signal represented therein. Combining these features, a user seeing that the audio portion of the video clip data file is identified, for example, as NAME—M2., would recognize, upon reference to a chart, that the file is (for example) an audio data file which is representative of a stereo audio signal sampled at 192 bits per channel, having a frequency range of 44.1 kHz, a compression ratio of 4.5:1, and which is encoded using the XING MPEG Audio standard with a 64 KBPS output rate. Analogous naming conventions may be established for all component data files.

Subsequent to the transfer of the component data files of a video clip data file from a file server to the storage device of the user's personal computer, a process which is well known, the user may initiate the display of the video clip represented by the video clip data file by means of the process and apparatus disclosed herein. In the specific embodiment and best mode of the invention, this is achieved by a video clip player implemented through computer code executed on the user's personal computer. The code executes the sequences of steps described above and in FIGS. 4–6, operating on data of the type represented by FIG. 2 and in the manner illustrated by FIG. 3.

To allow a personal computer to display the various components of a video clip, the video clip data must be processed in a manner which converts the component data into forms which are displayable by the computer. This requires decompression or decoding of the data as illustrated in FIG. 3. In the specific embodiment and best mode of the invention, the personal computer is programmed to decompress video data stored in the MPEG1 format. The MPEG1 video data format is a well known video data format which is developed and promulgated by the Motion Picture Expert Group. Consequently, the video decompression driver of the present embodiment as illustrated in FIG. 6, is a computer-implemented MPEG1 decompression driver which receives data in the MPEG1 format and converts it to data in the Device Independent Bitmap (DIB) format. The DIB format is compatible with the display logic and circuitry found in personal computers. Computer implemented MPEG1 decompression drivers may be found, for example, as a component of computer software packages such as the XING-IT software distributed by the XING Corporation. For purposes of compatibility recognition, video component data files compatible with this embodiment of the invention are assigned the file identifier extension .NMS.

Similarly, the specific embodiment and best mode of the invention is configured to decode audio data represented by data stored in the WAV (WINDOWS AUDIO VIDEO) file format. Decoders for audio data stored in this format are found in computer software distributed by the MICROSOFT Corporation. The decoded audio data is a digitized data stream which may be converted by means of an analog to digital (A/D) converter into an audio signal. Simultaneous decoding and display of the audio and video components is implemented through the well known method of non-preemptive multitasking, such as is facilitated by the WINDOWS operating system. For purposes of compatibility recognition, audio component data files compatible with this embodiment of the invention are assigned the file identifier extension .WAV.

The specific embodiment of the invention also is configured to decode still image data stored in the JPEG still image data format. JPEG is formulated and distributed by the makers of the MPEG1 data format, and JPEG decoders are well known. For purposes of compatibility recognition, still image component data files compatible with this embodiment of the invention are assigned the file identifier extension .NIM.

While the above formats are presently supported in the specific embodiment and best mode of the invention, the disclosure provided herein will suggest alternative embodiments to those skilled in art of digital audio and video processing. Alternative audio and video data formats may be supported by substituting the proper decompression or decoding algorithms. For example, a decoder of still image data adapted for use with the GIF, TIF, or BMP formats could be substituted for the JPEG decoder of the present embodiment. Alternatively, a single decompression driver could be substituted which is capable of processing audio and video data stored in an interleaved format. Examples of such formats are AVI (AUDIO VIDEO INTERLEAVE), produced by the MICROSOFT Corporation, QUICKTIME for WINDOWS, produced by the APPLE COMPUTER Corporation, and MPEG2, produced by the Motion Picture Expert Group.

Similarly, there are numerous well-known methods for the compression or encoding of text which may be implemented. The present embodiment of the invention uses a simple mathematical alteration of the text data which is reversed upon decoding. This alteration involves the permutation of each data word representing each text character by the addition of a fixed four byte revolving key. This encoding does not change the length of the file. Decryption involves the simple subtraction of this same fixed revolving key from each character in the encrypted file. Alternatively, and decoding modules configured for use with any of the well-known encryption methods may be similarly adapted. For purposes of compatibility recognition, text component data files compatible with this embodiment of the invention are assigned the file identifier extension .NTX.

FIG. 7 illustrates the video display unit user interface of the present embodiment of the invention. The interface is designed to be intuitively useable by users who are familiar with the WINDOWS style user interface and operating system. The user interface includes a large video display area 50 having a resolution of 320 pixels×240 pixels. Below the video display area are situated a first text display area 52 and a second text display area 54. Between the text display areas and the video display area is the slide bar area 56 which includes a slide bar 58 for performing the functions described above. To the right of the video display area is the user control array 58 which includes a play button 60, rewind button 62, pause button 64, stop button 66, and close button 68. These buttons are intended to be operated by the user with the assistance of a mouse-directed pointer. The method of such use and the technology for its implementation are well known in the art of computer programming.

Prior to the audio and video decoding sequence, the video player of the present embodiment decodes and displays text. The text is examined for markers which indicate points of demarcation between groups of text data representing groups of text to be displayed in separate display areas. In practice it has been found that two consecutive characters such as "@@" are sufficient to provide such demarcation. FIG. 6 illustrates the use of a counter which is referred to 220 to determine whether a point of demarcation has been detected. This serves to indicate that subsequent text should be written 224 to the next text area defined in RAM, until such time as a further demarcation point is detected.

What is claimed is:

1. A method for displaying a multimedia presentation comprising:

displaying a fixed graphical user interface concurrently comprising a first fixed text display area, a fixed video display area, and video display command buttons;

extracting from a single multimedia presentation data file represented by a single data file identifier, multimedia presentation component data files including a video data file, an audio data file, an encrypted text data file, at least one still image data file, and a synchronization data file;

decrypting text represented by the encrypted text data file to produce decrypted text;

determining a predefined video area portion of the decrypted text for display in the video area of the fixed graphical user interface and a first predefined fixed portion of the decrypted text for display in the first fixed text display area of the fixed graphical user interface;

continuously displaying the first predefined fixed portion of the decrypted text in the first fixed text display area of the fixed graphical user interface; and alternately displaying one of video represented by the video data files still images represented by the at least one still image date file, and the predefined video area portion of the decrypted text in the fixed video display area of the fixed graphical user interface in accordance with video display commands provided by a user through the graphical user interface and further in accordance with synchronization data of the synchronization data file.

2. The method recited in claim 1, further comprising:

determining a second predefined fixed portion of the decrypted text for display in a second fixed text display area of the fixed graphical user interface; and continuously displaying the second predefined fixed portion of the decrypted text in the second fixed text display area of the fixed graphical user interface.

3. A computer readable storage medium having stored therein machine readable data representing control programming for controlling performance of a system for displaying a multimedia presentation, the system providing the functions of:

displaying a fixed graphical user interface comprising a first fixed text display area, a fixed video display area, and video display command buttons;

extracting from a single multimedia presentation data file represented by a single data file identifier, multimedia presentation component data files including a video data file, an audio data file, an encrypted text data file, at least one still image data file, and a synchronization data file;

decrypting text represented by the encrypted text data file to produce decrypted text;

determining a predefined video area portion of the decrypted text for display in the video area of the fixed graphical user interface and a first predefined fixed portion of the decrypted text for display in the first fixed text display area of the fixed graphical user interface;

continuously displaying the first predefined fixed portion of the decrypted text in the first fixed text display area of the fixed graphical user interface; and alternately displaying one of video represented by the video data file, still images represented by the at least one still image date file, and the predefined video area portion of the decrypted text in the fixed video display area of the fixed graphical user interface in accordance with video display commands provided by a user through the graphical user interface and further in accordance with synchronization data of the synchronization data file.

4. The method recited in claim 3, further comprising:

determining a second predefined fixed portion of the decrypted text for display in a second fixed text display area of the fixed graphical user interface; and continuously displaying the second predefined fixed portion of the decrypted text in the second fixed text display area of the fixed graphical user interface.

5. A system for displaying a multimedia presentation, comprising:

means for displaying a fixed graphical user interface comprising a first fixed text display area, a fixed video display area, and video display command buttons;

means for extracting from a single multimedia presentation data file represented by a single data file identifier, multimedia presentation component data files including a video data file, an audio data file, an encrypted text data file, at least one still image data file, and a synchronization data file;

means for decrypting text represented by the encrypted text data file to produce decrypted text;

means for determining a predefined video area portion of the decrypted text for display in the video area of the fixed graphical user interface and a first predefined fixed portion of the decrypted text for display in the first fixed text display area of the fixed graphical user interface;

means for continuously displaying the first predefined fixed portion of the decrypted text in the first fixed text display area of the fixed graphical user interface; and means for alternately displaying one of video represented by the video data file, still images represented by the at least one still image date file, and the predefined video area portion of the decrypted text in the fixed video display area of the fixed graphical user interface in accordance with video display commands provided by a user through the graphical user interface and further in accordance with synchronization data of the synchronization data file.

6. The system recited in claim 5, further comprising:

means for determining a second predefined fixed portion of the decrypted text for display in a second fixed text display area of the fixed graphical user interface; and means for continuously displaying the second predefined fixed portion of the decrypted text in the second fixed text display area of the fixed graphical user interface.

* * * * *